(12) United States Patent
Linzer et al.

(10) Patent No.: US 8,427,547 B1
(45) Date of Patent: Apr. 23, 2013

(54) CAMERA WITH HIGH-QUALITY STILL CAPTURE DURING CONTINUOUS VIDEO CAPTURE

(75) Inventors: Elliot N. Linzer, Suffern, NY (US); Leslie D. Kohn, Fremont, CA (US); Chi Hong John Ju, Fremont, CA (US)

(73) Assignee: Ambarella, Inc., Santa Clara, CA (US)

( * ) Notice: Subject to any disclaimer, the term of this patent is extended or adjusted under 35 U.S.C. 154(b) by 80 days.

(21) Appl. No.: 13/009,058

(22) Filed: Jan. 19, 2011

Related U.S. Application Data

(60) Division of application No. 12/252,703, filed on Oct. 16, 2008, now Pat. No. 7,898,573, which is a continuation of application No. 11/413,897, filed on Apr. 28, 2006, now Pat. No. 7,675,550.

(51) Int. Cl.
*H04N 5/225* (2006.01)
(52) U.S. Cl.
USPC .................................................. 348/220.1
(58) Field of Classification Search ..... 348/220.1–222.1
See application file for complete search history.

(56) References Cited

U.S. PATENT DOCUMENTS

| | | | |
|---|---|---|---|
| 5,153,730 A | 10/1992 | Nagasaki et al. | 348/231.6 |
| 5,585,856 A | 12/1996 | Nakaya et al. | 348/441 |
| 5,884,005 A | 3/1999 | Peters | 386/109 |
| 6,144,797 A | 11/2000 | MacCormack et al. | 386/46 |
| 7,139,020 B2 * | 11/2006 | Tamashima | 348/231.3 |
| 7,333,678 B1 | 2/2008 | Huang et al. | 382/300 |
| 7,372,595 B1 | 5/2008 | Lyon et al. | 358/1.9 |
| 7,675,550 B1 * | 3/2010 | Linzer et al. | 348/220.1 |
| 2001/0036231 A1 | 11/2001 | Easwar et al. | 375/240.19 |
| 2002/0172505 A1 | 11/2002 | Takahashi et al. | 386/120 |
| 2003/0030729 A1 | 2/2003 | Prentice et al. | 348/220.1 |
| 2003/0063201 A1 | 4/2003 | Hunter et al. | 348/241 |
| 2003/0112340 A1 | 6/2003 | Okada et al. | 348/220.1 |
| 2003/0169278 A1 | 9/2003 | Obrador | 345/629 |
| 2004/0090548 A1 | 5/2004 | Obrador | 348/333.01 |
| 2004/0131264 A1 | 7/2004 | Sakuyama et al. | 382/233 |
| 2004/0156060 A1 | 8/2004 | Ikeda et al. | 358/1.9 |
| 2005/0104864 A1 | 5/2005 | Zhang et al. | 345/173 |
| 2005/0146623 A1 | 7/2005 | Juen | 348/220.1 |
| 2005/0174438 A1 | 8/2005 | Nakakuki | 348/222.1 |
| 2006/0110055 A1 | 5/2006 | Shiina | 382/232 |

\* cited by examiner

*Primary Examiner* — Timothy J Henn
(74) *Attorney, Agent, or Firm* — Christopher P. Maiorana, PC

(57) ABSTRACT

A method for processing a source frame is disclosed. The method generally includes the steps of (A) generating an intermediate frame by digitally processing the source frame, wherein the intermediate frame has an intermediate resolution and has an intermediate color space, (B) generating a video frame by down-sampling the intermediate frame, wherein the video frame has a video resolution lower than the intermediate resolution and has a video color space different than the intermediate color space, (C) generating a video stream by compressing the video frame with a video encoding technique and (D) generating a still picture by formatting the intermediate frame with a picture formatting technique, wherein (i) the still picture has the intermediate resolution and (ii) generating the still picture occurs substantially simultaneously with generating the video stream.

20 Claims, 7 Drawing Sheets

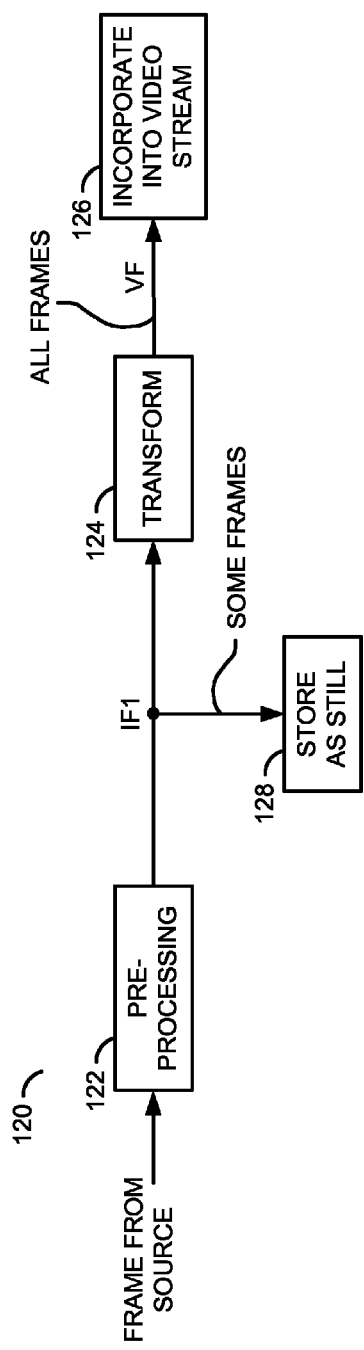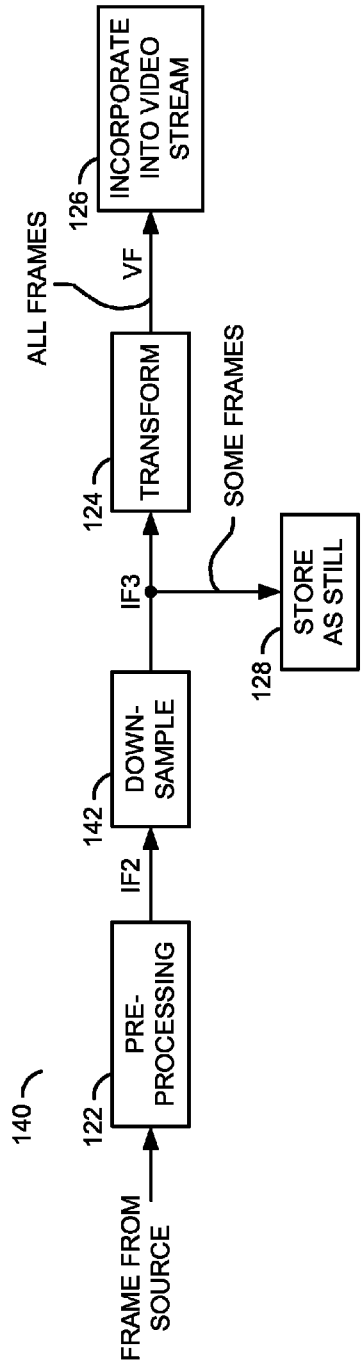

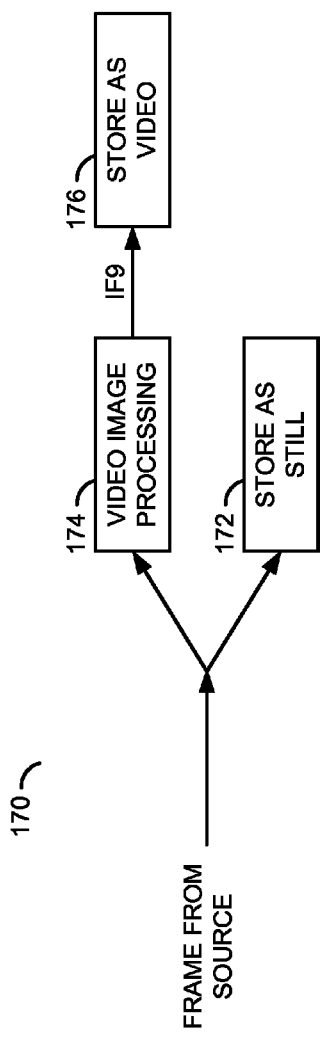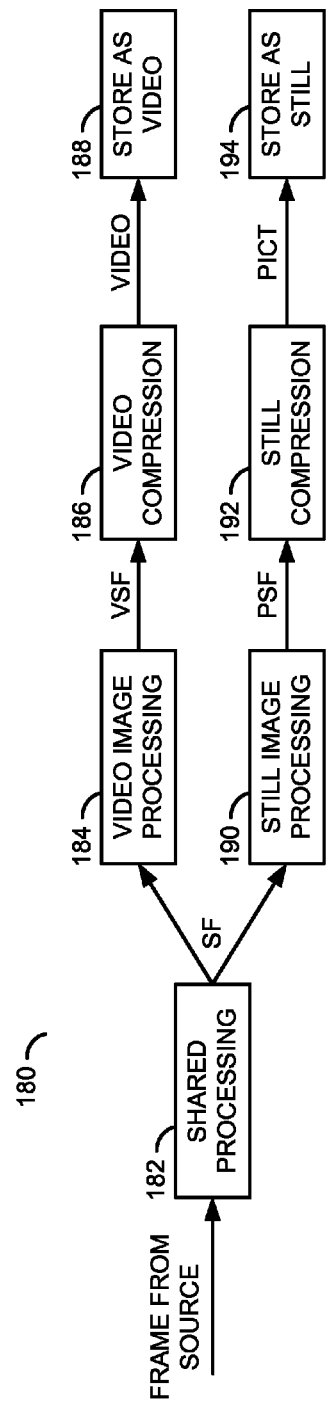

US 8,427,547 B1

CAMERA WITH HIGH-QUALITY STILL CAPTURE DURING CONTINUOUS VIDEO CAPTURE

This is a divisional application of U.S. Ser. No. 12/252,703, filed Oct. 16, 2008 now U.S. Pat. No. 7,898,573, which is a continuation of U.S. Ser. No. 11/413,897, filed Apr. 28, 2006 now U.S. Pat. No. 7,675,550, which is incorporated by reference.

FIELD OF THE INVENTION

The present invention relates to a method and/or architecture for digital cameras generally and, more particularly, to a camera with high-quality still capture during continuous video capture.

BACKGROUND OF THE INVENTION

Many cameras now offer the ability to capture still pictures and video sequences. However, compromises are made on the still picture quality and performance when recording video. For example, processing of the video information limits a rate at which consecutive still pictures can be recorded. Furthermore, the video recording is interrupted when the still pictures are captured. In particular, the recorded video misses several video frames while the camera is processing the still picture instead of processing the video.

SUMMARY OF THE INVENTION

The present invention concerns a method for processing a sensor frame. The method generally comprises the steps of (A) generating an intermediate frame by digitally processing the source frame, wherein the intermediate frame has an intermediate resolution and has an intermediate color space, (B) generating a video frame by down-sampling the intermediate frame, wherein the video frame has a video resolution lower than the intermediate resolution and has a video color space different than the intermediate color space, (C) generating a video stream by compressing the video frame with a video encoding technique and (D) generating a still picture by formatting the intermediate frame with a picture formatting technique, wherein (i) the still picture has the intermediate resolution and (ii) generating the still picture occurs substantially simultaneously with generating the video stream.

The objects, features and advantages of the present invention include providing a camera with high-quality still capture during continuous video capture that may (i) enable simultaneous capture of still pictures and video streams, (ii) avoid missing video frames when recording still pictures, (iii) record still pictures at a higher resolution than the video frames, (iv) implement different compression techniques for the still pictures as compared with the video and/or (v) implement different pre-processing methods for the still pictures as compared with the video.

BRIEF DESCRIPTION OF THE DRAWINGS

These and other objects, features and advantages of the present invention will be apparent from the following detailed description and the appended claims and drawings in which:

FIG. 2 is a flow diagram of a first example method for processing sensor images;

FIG. 3 is a flow diagram of a second example method for processing the sensor images;

FIG. 6 is a flow diagram of a first example method for parallel processing the sensor frames;

FIG. 7 is a flow diagram of a second example method for parallel processing the sensor frames;

DETAILED DESCRIPTION OF THE PREFERRED EMBODIMENTS

Figure 1:
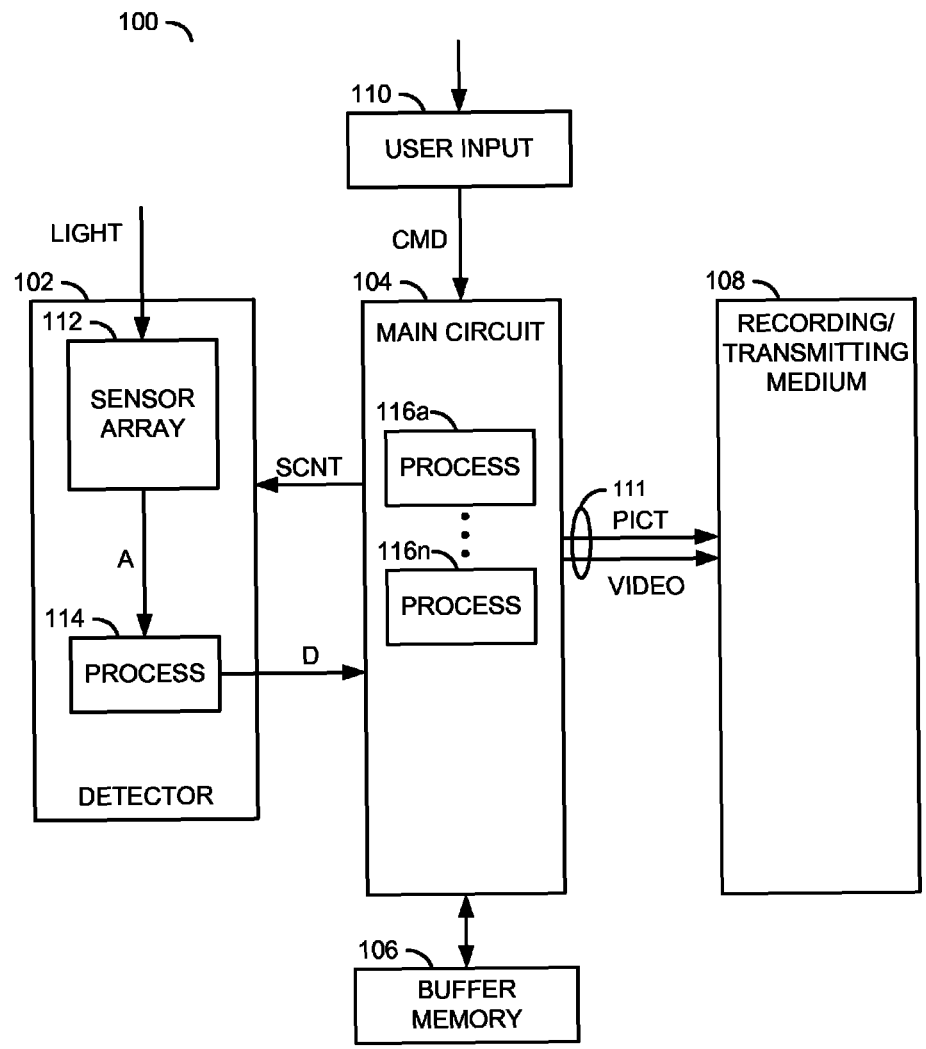
FIG. 1 is a block diagram of a first example system in accordance with a preferred embodiment of the present invention.

Referring to FIG. 1, a block diagram of a first example system 100 is shown in accordance with a preferred embodiment of the present invention. The system (or apparatus) 100 may be referred to as a camera. The camera 100 generally comprises a circuit (or module) 102, a circuit (or module) 104, a circuit (or module) 106, a circuit (or module) 108 and a circuit (or module) 110. An optical signal (e.g., LIGHT) may be received by the circuit 102. The circuit 102 may generate and present a digital signal (e.g., D) to the circuit 104. A control signal (e.g., SCNT) may be generated and presented form the circuit 104 to the circuit 102. The circuit 104 may also generate and present a picture signal (e.g., PICT) and a video signal (e.g., VIDEO) to the circuit 108. A command signal (e.g., CMD) may be generated by the circuit 110 and presented to the circuit 104.

The circuit 102 may be referred to as a detector circuit. The detector circuit 102 may be operational to convert the optical image received in the signal LIGHT into the digital signal D in response to the signal SCNT. The digital signal D may convey one or more optical images as one or more electronic images or frames. The control signal SCNT may carry windowing, binning, read rate, offset, scaling, color correction and other information for use by the detector circuit 102. The electronic frames may be generated having an initial resolution (e.g., a horizontal number of image elements by a vertical number of image elements) and a (fixed) initial color space (e.g., a Bayer color space) at an initial data rate. In some embodiments, the sensor circuit 102 may include an image pipeline or other image source that supplies source images in the signal D.

The circuit 104 may be referred to as a main circuit. The main circuit 104 may be configured to generate the signal PICT and the signal VIDEO by processing the one or more electronic images received in the digital signal D as instructed by a user via the command signal CMD. The main circuit 104 may be operational to generate the control signal SCNT based on the user selections received through the command signal CMD. In some embodiments, both of the signal PICT and the signal VIDEO may be transferred to the circuit 108 through a single interface 111. In other embodiments, the signal PICT and the signal VIDEO may be transferred through independent interfaces.

The signal PICT generally comprises one or more still pictures (e.g., JPEG, TIFF). The signal VIDEO generally comprises a video bitstream (e.g., ITU-R BT.656-4, H.264/AVC, MPEG-2, MPEG-4) having a sequence of pictures (or frames). The video picture sequence carried by the signal VIDEO may be generated having a final resolution smaller than the initial resolution of the electronic frames in the digital signal D. The one or more still pictures carried in the signal PICT may be generated having a final resolution the same as or smaller than the initial resolution of the electronic frames, in the digital signal D. The command signal CMD may carry zoom factor commands and optional mode commands from the user. In some embodiments, the detector circuit 102 and the main circuit 104 may be fabricated in (on) separate dies. In other embodiments, the detector circuit 102 and the main circuit 104 may be fabricated in (on) the same die.

The circuit 106 may be referred to as a buffer memory circuit. The buffer memory circuit 106 may be operational to temporarily store image data (e.g., luminance and chrominance) for the main circuit 104. In some embodiments, the buffer memory circuit 106 may be fabricated as one or more dies separate from the main circuit 104 fabrication. In other embodiments, the buffer memory circuit 106 may be fabricated in (on) the same die as the main circuit 104.

The circuit 108 may be referred to as a medium. The medium 108 generally comprises one or more nonvolatile memory devices and/or one or more transmission media capable of storing/transmitting the still pictures and the video streams received in the signals PICT and VIDEO, respectively. In some embodiments, the recording medium 108 may comprise a single memory medium. For example, the recording medium 108 may be implemented as a FLASH memory or a micro hard disk drive (also known as a "1-inch" hard drive). The memory may be sized (e.g., 4 gigabyte FLASH, 12 gigabyte hard disk drive) to store up to an hour or more of high-definition digital video, more than a thousand 8-megapixel still pictures or various combinations of digital video and still pictures. In some embodiments, the recording medium 108 may be implemented as multiple media. For example, (i) a FLASH memory may be implemented for storing the still pictures and (ii) a tape medium or an optical medium may be implemented for recording the video. The transmitting medium 108 may be implemented as a wired, wireless and/or optical medium. For example, the wired transmission medium 108 may be implemented as an Ethernet network. A wireless transmission medium 108 may be implemented as a wireless Ethernet network and/or a wi-fi network. An optical transmission medium 108 may be implemented as an optical. Serial Digital Interface video channel. Other types of media may be implemented to meet the criteria of a particular application.

The circuit 110 may be referred to as a user input circuit. The user input circuit 110 may be operational to generate the signal CMD based on commands received from a user. The commands received may include, but are not limited to, a snap picture command, a video on command, a video off command, a zoom in command, a zoom out command, a normal mode, a low light mode and a low distortion mode. In some embodiments, the signal CMD may comprise multiple discrete signals (e.g., one signal for each switch implemented in the user input circuit 110). In other embodiments, the signal CMD may carry the user entered commands in a multiplexed fashion as one or a few signals.

The detector circuit 102 generally comprises a sensor array 112 and a circuit (or module) 114. The sensor array 112 may be operational to convert the optical images into a series of values in a signal (e.g., A). The values conveyed in the signal A may be analog voltages representing an intensity value at a predetermined color for each individual sensor element of the sensor array 112. The sensor array 112 may include an electronic cropping (or windowing) capability. The electronic cropping capability may be operational to limit readout of image elements in a window (or an active area) of the sensor array 112. The process circuit 114 may be operational to process and then convert the analog signal A to generate the digital signal D.

Processing of the electronic images in the processor circuit 114 may include, but is not limited to, analog gain for color corrections, analog offset adjustments for black level calibrations, digital gain for color corrections and digital offsets for color corrections. The conversion generally comprises an analog to digital conversion (e.g., 10-bit). An example implementation of the detector circuit 102 may be an MT9T001 3-megapixel digital image sensor available from Micron Technology, Inc., Bosie, Id. Larger or smaller detector circuits 102 may be implemented to meet the criteria of a particular application.

The main circuit 104 generally comprises two or more processor circuits (or modules) 116a-116n. Each of the processor circuits 116a-116n may be optimally designed to perform one or a few different operations on the image data within the main circuit 104. For example, the processor 116a may be adapted to perform pre-compression processing on the images received in the signal D. Furthermore, the processor 116n may be adapted to compress video frames and still pictures in a time-multiplexed sequence.

Operation of the main circuit 104 generally results in the still pictures differing from the video stream pictures in one or more ways. In a first case, the still pictures may be recorded in (on) the recording medium 108 at a higher resolution than the video. For example, a video frame typically ranges in size from 720×480 pixels (e.g., standard definition) to 1920×1080 pixels (e.g., high definition). However, the still picture resolution may range from 3 megapixels up to 8 megapixels or more.

In another case, the compression format for the video may differ from the compression format (if any) for the still pictures. The video is typically compressed using a Digital Video, MPEG-2, MPEG-4 or H.264 standard. The still pictures typically use JPEG compression or a lossless compression. The still pictures may be stored in a JPEG File Interchange Format (JFIF) and/or an uncompressed Bayer-domain picture format. Still pictures stored as Bayer-domain pictures using no compression or lossless compression may be referred to as raw pictures.

In still another case, the pre-compression processing used for the video may differ from the pre-compression processing used for the still pictures. For example, the video and still pictures typically use different color spaces. The video color space may be compliant with one of the International Telecommunication Union Radiocommunication Sector ITU-R BT.709 recommendation for standard definition video and the Society of Motion Picture and Television Engineers standard SMPTE 240M for high-definition video. Furthermore, video sequences that are to be stored at very low bit rates may undergo more noise reduction pre-processing than the still pictures.

Referring to FIG. 2, a flow diagram of a first example method 120 for processing sensor images is shown. The method (or process) 120 generally comprises a step (or block) 122, a step (or block) 124, a step (or block) 126 and a step (or block) 128. The method 120 generally achieves a high-resolution still picture capture with substantially simultaneous gap-less video capture.

All of the sensor frames presented from the sensor array 112 or the detector circuit 102 may be pre-processed in the step 122. The pre-processing may include, but is not limited to, analog gain, analog offset adjustment, analog to digital conversion, digital gain, digital offset adjustment, color space conversion, noise reduction and/or demosaicing. The pre-processing operations of step 122 may be implemented in the process circuit 114 and/or the main circuit 104. A product of the pre-processing may be a sequence of intermediate frames (e.g., IF1). The intermediate frames may have the same resolution and data rate as the image data received from the sensor array 112. In some embodiments, the intermediate frames may have the same color space (e.g., a Bayer color space) as the image data received from the sensor array 112. In other embodiments, the intermediate frames may be a color space (e.g., sRGB, YCbCr, YUV) different from the color space received from the sensor array 112.

In the step 124, the intermediate frames may be transformed (e.g., down-sampled and color space converted) by the main circuit 104 to generate video frames (e.g., VF). The down-sampling generally converts the intermediate frames IF1 to a lower resolution suitable for encoding and compression by a particular video encoding technique (e.g., H.264, MPEG-2, MPEG-4). The color space conversion may transform the frames into a suitable video color space. The main circuit 104 generally encodes the down-sampled frames into a video stream (e.g., the signal VIDEO) for storage in a recording medium 108 in the step 126. While the video stream is being created, the main circuit 104 may also format one or more of the intermediate frames into a file format (e.g., JFIF) in the step 128. The recording medium 108 may store the still pictures as part of the step 128.

Referring to FIG. 3, a flow diagram of a second example method 140 for processing the sensor images is shown. The method (or process) 140 generally comprises the step (or block) 122, the step (or block) 124, the step (or block) 126, the step (or block) 128 and a step (or block) 142. The method 140 may be similar to the method 120 with the added step 142.

In the method 140, the pre-processing step 122 may generate intermediate frames (e.g., IF2). The step 142 may then down-sample the intermediate frames IF2 to generate other intermediate frames (e.g., IF3). The intermediate frames IF3 generally have a lower resolution than the intermediate frames IF2. The step 124 may further down-sample and color space convert the intermediate frames IF3 to create the video frames VF. The step 128 may operate to store one or more of the intermediate frames IF3 as still pictures.

Figure 4:
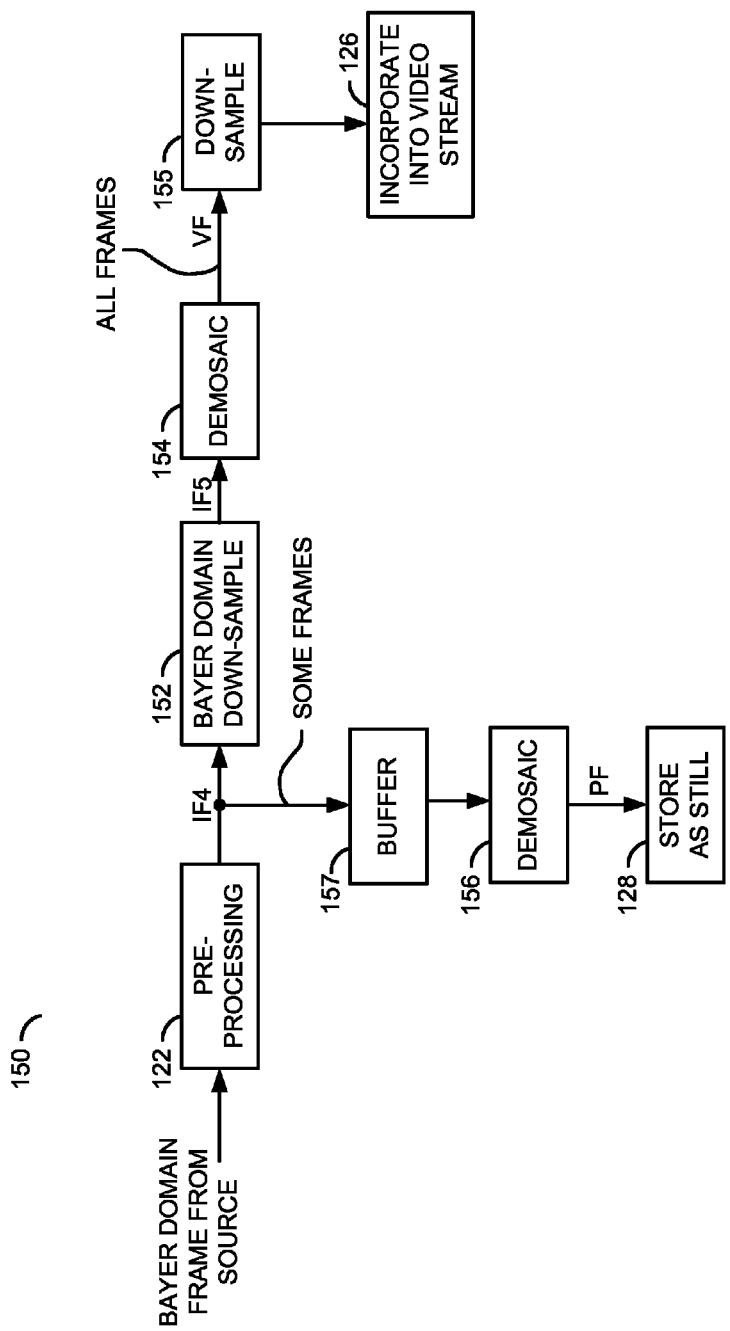
FIG. 4 is a flow diagram of a third example method for processing the sensor images.

Referring to FIG. 4, a flow diagram of a third example method 150 for processing the sensor images is shown. The method (or process) 150 generally comprises the step (or block) 122, the step (or block) 126, the step (or block) 128, a step (or block) 152, a step (or block) 154, a step (or block) 155, a step (or block) 156 and a step (or block) 157. Since not every sensor frame is stored as a still picture, the method 150 generally does not consume a significant amount of processing power to fully demosaic every sensor-resolution frame and yet still achieves the highest quality for the still pictures that may be demosaiced at the full resolution.

In the step 122, the sensor frames may be pre-processed to generate intermediate frames (e.g., IF4). The intermediate frames IF4 may have the full sensor resolution and may remain in the original sensor color space (e.g., Bayer). Along a video path, the main circuit 104 may perform a Bayer-domain down-sampling of the intermediate frames IF4 in the step 152 to generate additional intermediate frames (e.g., IF5). The intermediate frames IF5 may have a lower resolution than the sensor frames and may retain the Bayer color space. The Bayer-domain down-sampling generally allows for a better tradeoff between demosaic performance and the final video image quality. In the step 154, the main circuit 104 generally performs a demosaic of the intermediate frames IF5 to generate the video frames VF. The demosaic operations generally convert the color space from the Bayer color space to a video color space (e.g., ITU-R BT.709, SMPTE 240M). The resolution of the video frames VF may remain the same as the intermediate frames IF5. The optional step 155 may down-sample the video frames VF to a lower resolution. In the step 126, the main circuit 104 may convert the video frames VF into a video stream for storage in the recording medium 108.

Along a still picture path, the main circuit 104 may be operational in the step 156 to demosaic the intermediate frames IF4. Where the demosaic throughput rate is lower than the sensor data rate, the optional step 157 may concurrently hold one or more intermediate frames that have not yet been demosaiced. The demosaic operation generally creates the still picture frames PF. The still picture frames may have the same resolution as the intermediate frames IF4, which is greater than the resolution of the video frames. The demosaic step 156 may convert the color space of the intermediate frames IF4 from the Bayer-domain to a picture domain color space (e.g., sRGB). In the step 128, the main circuit 104 may store the still picture frames PF in the recording medium 108.

Figure 5:
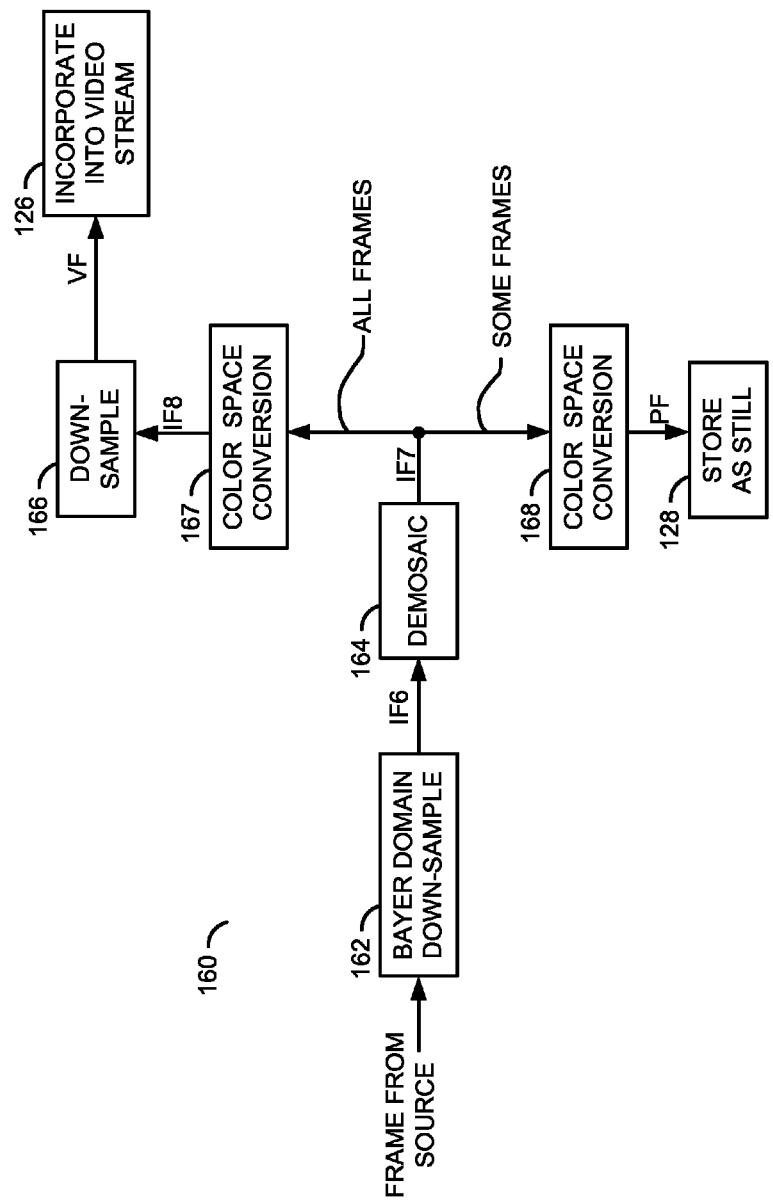
FIG. 5 is a flow diagram of a fourth example method for processing the sensor images.

Referring to FIG. 5, a flow diagram of a fourth example method 160 for processing the sensor images is shown. The method (or process) 160 generally comprises the step (or block) 126, the step (or block) 128, a step (or block) 162, a step (or block) 164, a step (or block) 166, a step (or block) 167 and a step (or block) 168. The method 160 may be useful in implementations where (i) a video processor cannot demosaic at the full sensor resolution even for occasional stills, (ii) the design may use the same demosaic processing for video and still pictures and/or (iii) the memory bandwidth to store the still pictures should be less than in the method 150 because the resolution in the method 160 is less than the full sensor resolution. As such, the sensor frames may be initially down-sampled to the largest frames practical for the main circuit 104 to handle. The down-sampled frames may then be used as the source for still pictures. Further down-sampling may be performed to achieve the video resolution.

Frames from the sensor may be down-sampled in the Bayer-domain by process circuit 114 or a special front end of the main circuit 104 the in the step 162. The down-sample step 162 generally creates intermediate frames (e.g., IF6). The intermediate frames IF6 may have the same color space as the sensor frames (e.g., Bayer), but with a lower resolution. The lower resolution may help reduce the pixel bit-rate to a maximum level suitable for real-time processing by the rest of the main circuit 104. In the step 164, the main circuit 104 may demosaic the intermediate frames IF6 to generate additional intermediate frames (e.g., IF7). The intermediate frames IF7 may have the same resolution as the intermediate frames IF6.

In some embodiments, the intermediate frames IF7 may be generated in a video color space. Therefore, a color space conversion of the intermediate frames IF7 may be performed in the step 168 to convert from the video color space to the still picture color space of the still picture frames PF. In other embodiments, the intermediate frames IF7 may be generated in an intermediate color space. As such, a color space conversion of the intermediate frames IF7 may be performed in the step 168 to convert from the intermediate color space to the still picture color space of the still picture frames PF. In still other embodiments, the intermediate frames IF7 may be generated in the still picture color space and the optional step 168 may be eliminated (e.g., PF=IF7).

Along the video path, the frames from the sensor may be down-sampled in the Bayer-domain in the step 162 to create the intermediate frames IF6. In the step 164, the intermediate frames IF6 may be demosaiced to generate the intermediate frames IF7.

In the embodiments where the intermediate frames IF7 are not created in a video color space, a color space conversion may be performed in the step 167 to convert the intermediate frames IF7 into further intermediate frames (e.g., IF8). The color space conversion of the step 167 may convert (i) from the intermediate color space to the video color space or (ii) from the still picture color space to the video color space. In some embodiments, the intermediate frames IF7 may be generated in the video color space and thus the optional step 167 may be eliminated (e.g., IF8=IF7). The main circuit 104 may then down-sample all of the intermediate frames IF8 in the step 166 to achieve the intended video resolution in the video frames VF. In the step 126, the main circuit 104 may incorporate the video frames VF into a video stream for storage in the recording medium 108.

Conventional cameras compress the video at a very high compression ratio. As such, heavy noise reduction processing is used before the video compression. The heavy noise reduction reduces compression artifacts but may result in softness or other artifacts. For still pictures, using less noise reduction or no noise reduction is often preferred. As such, the methods 110, 140, 150 and/or 160 may perform video noise reduction and still picture noise reduction along the respective paths after the video data has been separated from the still picture data.

Referring to FIG. 6, a flow diagram of a first example method 170 for parallel processing the sensor frames is shown. The method (or process) 170 generally comprises a step (or block) 172, a step (or block) 174 and a step (or block) 176. In the method 170, the sensor frames undergo image processing for the video frames that is not used for the still frames. The phrase "image processing" generally involves conversion from a first 2-dimensional array of pixels to a second 2-dimensional array of pixels of the same size.

Along a still picture path, the main circuit 104 may provide minimal processing for one or more raw sensor frames before storage in (on) the recording memory 108 in the step 172. Minimal processing of raw images may include, but is not limited to, removal of electro-optical detection-induced imperfections, file formatting and possibly a lossless compression.

In a video path, the main circuit 104 may be operational to perform video image processing on the sensor frames in the step 174 to generate intermediate frames (e.g., IF9). The image processing may include, but is not limited to a color space conversion, noise reduction, down-sampling, video compression and other video frame image processing operations. In the step 176, the main circuit 104 may store the intermediate frames IF9 in (on) the recording memory 108.

Referring to FIG. 7, a flow diagram of a second example method 180 for parallel processing the sensor frames is shown. The method (or process) 180 generally comprises a step (or block) 182, a step (or block) 184, a step (or block) 186, a step (or block) 188, a step (or block) 190, a step (or block) 192 and a step (or block) 194. The method 180 may include shared image processing applicable for both the video and the still pictures in the step 182. Shared frames (e.g., SF) may be generated by the shared processing. The shared processing step 182 may include, but is not limited to, some noise reduction and demosaicing. The shared processing step 182 may be implemented as part of the process circuit 114 and/or the main circuit 104.

Along a video path, the main circuit 104 may be operational to implement video image processing on the shared frames SF in the step 184. The video image processing may include, but is not limited to, noise reduction, sharpening, decimating, down-sampling, color space conversion from a camera color space (e.g., Bayer) to a video color space (e.g., ITU-R BT.709, SMPTE 240M), edge detection, black level adjustments, gain adjustments, temporal filtering, spatial filtering and similar video pre-processing operations. Video shared frames (e.g., VSF) may be generated and presented from the video image processing step 184. In the step 186, the main circuit 104 may compress and format the pre-processed video shared frames VSF to generate the video stream in the signal VIDEO. The video compression and formatting in step 186 may include, but is not limited to Digital Video, MPEG-2, MPEG-4 or H.264. The video stream may be stored in (on) the recording medium 108 in the step 188.

Along the still picture path, the main circuit 104 may be operational to implement still picture image processing for one or more of the shared frames SF in the step 190. The still picture image processing may include, but is not limited to, color conversion from the camera color space (e.g., Bayer) to a still color space (e.g., sRGB, AdobeRGB), color conversion from the video color space to a still color space if the "shared processing" includes conversion to a video color space, a more gentle noise reduction than is used in video image processing step 184, and similar still picture pre-processing operations. The still image processing step 190 may generate and present picture shared frames (e.g., PSF). The main circuit 104 may compress the picture shared frames PSF in the step 192 using a still picture compression technique. The still compression technique may include, but is not limited to, JPEG, lossy still picture compression, lossless compression or non-compression techniques. A lossless compression/non-compression generally involves storing a raw sensor frame in the sensor color space. The lossless compression/non-compression may also be used for non-raw sensor formats, such as the Tagged Image File Format (TIFF). The step 192 may include embedding each of the compressed still picture frames in a file interchange format (e.g., JFIF) to generate the signal PICT. In the step 194, the still pictures may be stored in (on) the recording memory 108.

A particular case may exist in an implementation where the still picture is stored in a raw format and the video stream is not. Therefore, the video image processing in the step 184 includes demosaicing the raw frames and the still image processing in the step 190 does not. The video compression of the step 186 may still be implemented as a lossy compression, whereas the still picture compression in the step 192 is either a lossless still compression or no compression is implemented.

In order to (i) process the still pictures by encoding the still pictures at a higher resolution than the video or (ii) use different image processing techniques for the still pictures as compared with the video, additional work may be performed for the still pictures while processing a video sequence. Two different approaches may be used to process both video and still images with a single processor. In a conventional approach, the single processor skips several video frames while processing a still picture. When the conventional approach is used, the output video signal VIDEO will have gaps where video frames are missing. In the current invention, one or more processors (e.g., 116a-116n) may implement one or more time multiplex processing schedules that do not result in gaps in the video stream. Generally, the processors may first process some or all of a video frame, then process some or all of a still picture, return to processing the video, and so on.

Figure 8:
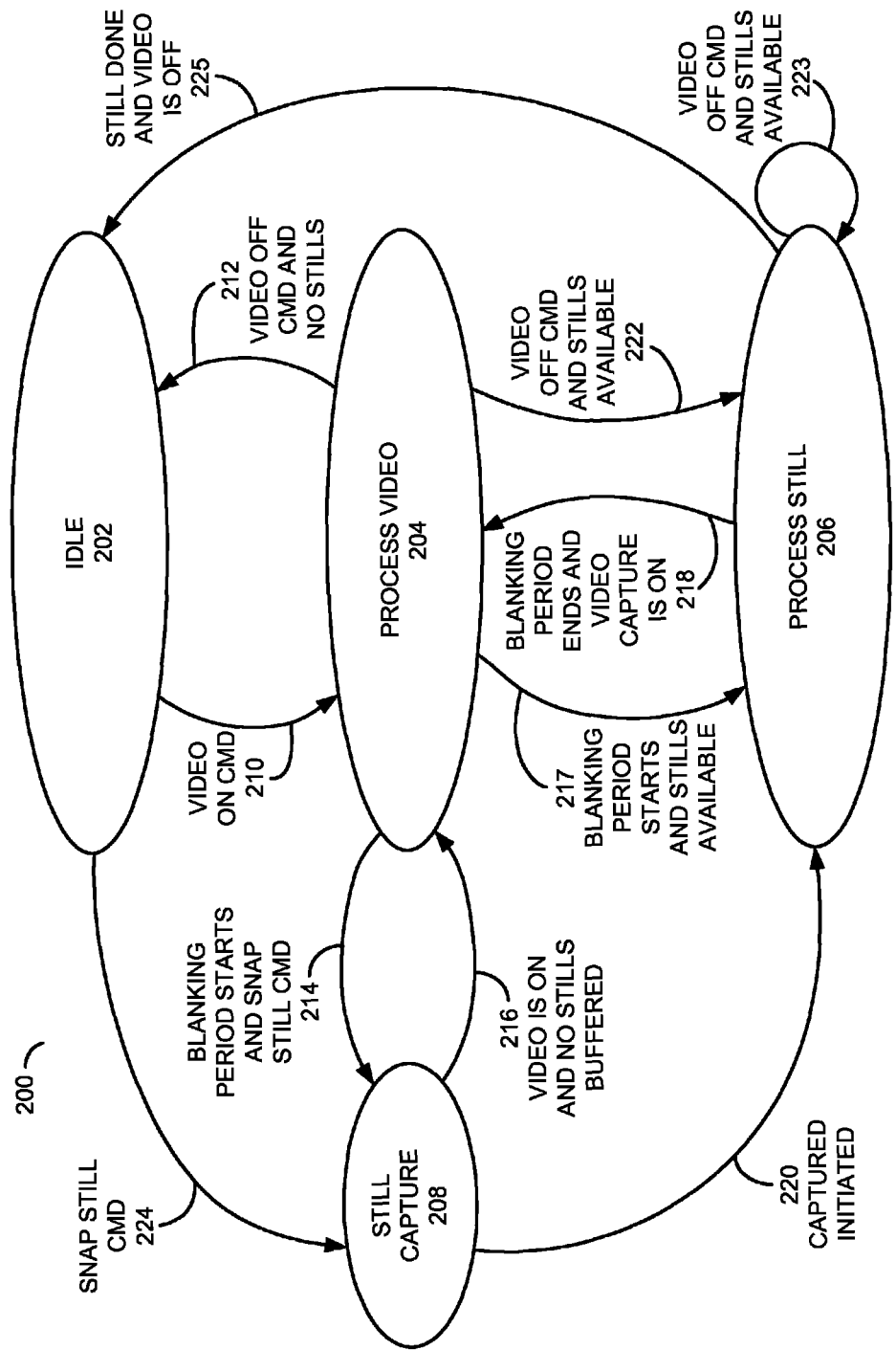
FIG. 8 is a state transition diagram of an example method for time-multiplexed processor operation on video frames and still pictures.

Referring to FIG. 8, a state transition diagram of an example method 200 for time-multiplexed processor operation on video frames and still pictures is shown. The method (or process) 200 generally comprises a state (or mode) 202, a state (or mode) 204, a state (or mode) 206 and a state (or mode) 208. The method 200 may be implemented in the main circuit 104.

When frames are read from the sensor array 112, a delay generally exists between the end of one frame and the start of the next frame. The delay is called a "blanking period" and is typically 5-10% of a frame time. Therefore, data coming from the sensor may be received by the main circuit 104 in an alternating pattern of (long) periods of "active" video (a single frame) and (short) blanking periods. The method 200 may be implemented where a processor (e.g., the main circuit 104) is designed to process data sequentially from the sensor. In such a case, a video frame may be processed during an "active capture" period and still picture processing of a single still picture may occur during one or more blanking periods.

The method 200 generally begins in the state 202 (e.g., IDLE). When the main circuit 104 receives a user command to being recording video (e.g., transition 210), the main circuit 104 may transition to the state 204 (e.g., PROCESS VIDEO). In the PROCESS VIDEO state 204, the main circuit may process sequential images received in the signal D. When the main circuit 104 received a user command to stop recording video (e.g., transition 212), the main circuit 104 may return back to the IDLE state 202.

If a user command is received to snap (or "take") a still picture while in the PROCESS VIDEO state 204, the main circuit 104 may transition to the state 208 (e.g., STILL CAPTURE) at the start of a subsequent blanking period (e.g., transition 214). Once the still picture capture is activated (e.g., transition 216), the main circuit 104 may transition back to the state 204 (e.g., PROCESS VIDEO). During buffering or after the still picture has been buffered and while the video is in a subsequent blanking period (e.g., transition 217), the main circuit 104 may begin to process a portion of the still picture in the PROCESS STILL state 206. The video processing has a higher priority than the still picture processing. Therefore, once the blanking period has ended (e.g., transition 218), processing of the next video frame may be performed in the PROCESS VIDEO state 204. As such, the video processing is generally performed as the sensor data is received, whereas still picture processing may be performed on buffered sensor data.

Upon reaching the blanking period of the next video frame, the main circuit 104 may return (e.g., transition 217) to the PROCESS STILL state 206 if at least a portion of a still picture remains buffered and unprocessed. Time-multiplexing between the PROCESS VIDEO state 204 and the PROCESS STILL state 206 may continue through the transitions 217 and 218 as long as the video frames continue to be recorded and one or more still pictures have not been fully processed.

If the main circuit 104 is still processing the first still picture snap command when a second still picture snap command is received, the transition 214 may cause the capture of the second still picture to commence at the start of the next blanking period. Processing of the first still picture may then continue (e.g., transition 220) in the PROCESS STILL state 206 until either the blanking period ends while the video capture is on (e.g., transition 218) or processing of the first still picture has completed. After finishing with the first still picture, the main circuit 104 may interleave the processing of the video frames in the PROCESS VIDEO state 204 and the processing of the second still picture in the PROCESS STILL state 206. If a last of the still pictures is completed before the current blanking period ends, processing of the next video frame may begin at the end of the current blanking period (e.g., transition 218).

If a user command to stop the video recording is received while in the PROCESSING VIDEO state 204 and one or more still pictures remain to be processed, the main circuit 104 may change (e.g., transition 222) to the PROCESS STILL state 206. If the user command to stop the video recording is received while in the PROCESS STILL state 206, the main circuit 104 may remain in the PROCESS STILL state 206 (e.g., transition 223) while still pictures remain to be processed.

If the main circuit 104 receives a user command to snap a still picture from the IDLE state 202 (e.g., video recording is off), the main circuit 104 may activate (e.g., transition 224) a capture of a still picture in the STILL CAPTURE state 208. Once the still capture has begun (e.g., transition 220), processing of the still picture may begin in the PROCESS STILL state 206. Upon completion of the still picture processing and while no video recording is in progress (e.g., transition 225), the main circuit 104 may return to the IDLE state 202. If the user command to start recording video is received while in the PROCESS STILL state 206, the main circuit 104 may remain in the PROCESS STILL state 206 until an end is reached for a current frame being received from the detector 112. At the end of the current frame (e.g., the blanking period starts), the main circuit 104 may transition (e.g., transition 218) to the PROCESS VIDEO state 204 such that the next frame may be processed as video. Processing may then alternate between the video frames during non-blanking periods and the still pictures during the blanking periods. Furthermore, all of the states 202 through 208 may include a task to processes the data received in the signal D to generate a signal suitable for driving a viewfinder.

The method 200 may be independently applied to each of the processor circuits 116a-116n in the main circuit 104. As such, each of the processor circuits 116a-116n may interleave between processing the video frames and processing the still pictures during different segments (or periods) of a time-multiplexed process. For example, the processing circuit 116a may perform pre-compression processing (e.g., color space conversion, noise reduction, down-sampling, etc.) of a video frame in a first time segment. The processor circuit 116n may then compress the first video frame in a second time segment, slightly delayed relative to the first time segment. The delay may exist because the processor circuit 116n cannot begin compressing the first video frame until the processor circuit 116a has performed some to all of the pre-compression processing.

Once the processor circuit 116a has reached the blanking period of the first video frame, the processor circuit 116a may transition from the PROCESS VIDEO state 204 to the PROCESS STILL state 206. In the PROCESS STILL state 206, the processor circuit 116a may work on a still picture during a third time segment. When the processor circuit 116a initially reaches the PROCESS STILL state 206, the processor circuit 116n may still be finishing the compression of the first video frame in the PROCESS VIDEO state 204. After the processor circuit 116n has finished with the first frame, the processor circuit 116n may also transition to the PROCESS STILL state 206. Once in the PROCESS STILL state 206, the processor circuit 116n may compress the still picture during a fourth time segment, slightly delayed from the third time segment.

Figure 9:
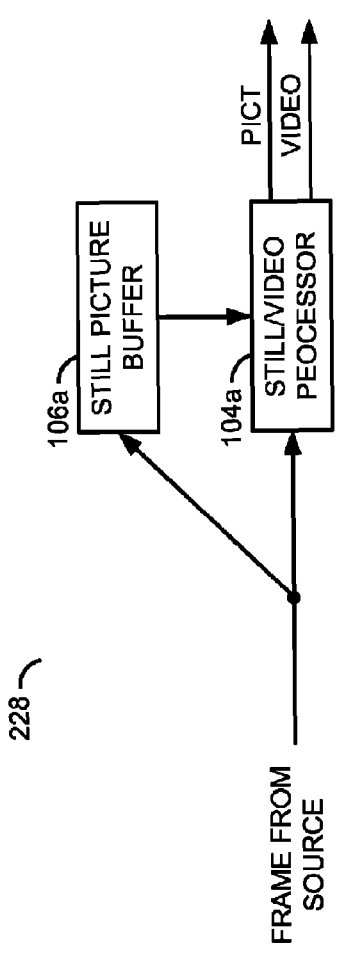
FIG. 9 is a block diagram of a second example system.

Referring to FIG. 9, a block diagram of a second example system 228 is shown. The system (or apparatus) 228 may be referred to as a camera. The camera 228 generally comprises a circuit (or module) 106a and a circuit (or module) 104a. The circuit 106a may be referred to as a still picture buffer. The still picture buffer 106a may be an embodiment of the buffer memory 106. The circuit 104a may be referred to as a still/video processor. The still/video processor 104a may be an embodiment of the main circuit 104.

Where a processor (e.g., the still/video processor 104a) is used in the time-multiplexed manner of the method 200 to process video and still pictures, several frame times may be used to process a single still picture. Therefore, each still picture may be buffered in the step 106a to permit the processing to alternate between the video frames and the still picture. In order to improve the usability of the camera 228, the memory implementing the still picture buffer step 106a may be sized to hold multiple still pictures simultaneously. The camera user may take new still pictures (e.g., by pressing a button) even when older still pictures still being buffered have not been fully processed. In one embodiment, the still picture buffer 106a may be implemented as part of an external DRAM. Processing of the video and still pictures by the main circuit 104a is generally similar to the processing of the video in the method 200. However, the still pictures processed may be received in real time from the sensor and/or read from the still buffer memory 106a. In some embodiments, the still/video processor circuit 104a may implement one or more of the methods 120, 140, 150, 160, 170, 180 and/or 200.

An advantage of processing video pictures during active video periods and (as in FIG. 9) and storing one or more still pictures in the still picture buffer 106a is that only the still pictures, and not the video, are capable of being buffered for an extended time. If the buffer is an external DRAM (e.g., buffer memory 106) and the still/video processor 104a is an integrated circuit (e.g., main circuit 104), processing the video pictures immediately upon capturing generally limits the bandwidth to the external DRAM to mainly video compression operations and storing the final processed video frames. However, since the blanking time may be very short, the still picture processing generally occurs only during a small fraction the total time thus reducing a sustained rate at which still pictures may be captured. The limited sustained rate is generally imposed even if the still/video processor 104a is fast enough to process the video frames faster than the sensor frames are arriving (e.g., faster than "real time").

Figure 10:
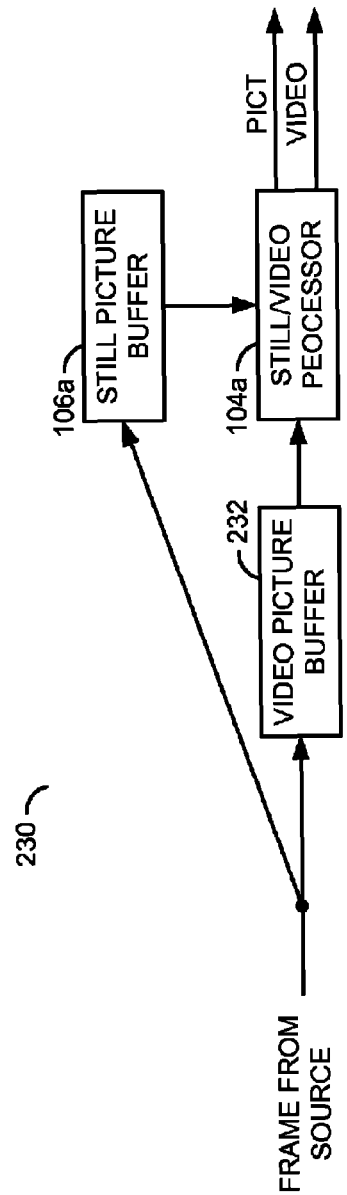
FIG. 10 is a block diagram of a third example system.

Referring to FIG. 10, a block diagram of a third example system 230 is shown. The system (or apparatus) 230 may be referred to as a camera. The camera 230 generally comprises the still/video processor 104a, the buffer memory 106a and a circuit (or module) 232. The camera 230 may be an embodiment of the camera 228 and/or the camera 100.

The circuit 232 may be referred to as a video picture buffer. The video picture buffer 232 may be operational to buffer limited video data waiting to be processed. The video picture buffer 232 may enable the camera 230 to (i) time-multiplex the use of the still/video processor circuit 104a to avoid storing the video frames to the external DRAM (e.g., still picture buffer 106a) and (ii) accomplish still image processing in both the blanking periods and in part during the active video capture. In some embodiments, the camera 230 may operate according to the method 200 (FIG. 8), with "process video" defined such that when the fullness of the video picture buffer 232 is low, the video processing stops. The phrase "process still" may be defined such that when the fullness of the video picture buffer 232 is high, the still picture processing stops.

In some embodiments, the still picture buffer 106a may be implemented as part of an external DRAM and the video picture buffer 232 may be (i) implemented on (in) the same integrated circuit as the video/still processor 104a (e.g., not part of the external DRAM) and (ii) sized to hold a small part of a video frame to limit costs of expensive on-chip memory.

The architecture of the camera 230 may be useful when the still/video processor 104a may process the image data faster than real time. For example, consider a case where the blanking period is 5% of the active frame time and the still/video processor 104a may process a video picture in 80% of the total frame time. If still pictures are processed only during the blanking periods, only 5% of the time may be spent on the still picture processing. However, the overall fullness of the video picture buffer 232 may tend to be lower when the video is being processed (since the processing is somewhat faster than real time). When the fullness of the video picture buffer 232 gets low enough, the still/video processor 104a may start processing the still pictures even though the video capture is active. Since video data may be added to, but not removed from, the video picture buffer 232 while the still/video processor 104a is operating on a still picture, the fullness of the video picture buffer 232 will generally increase. When the fullness of the video picture buffer 232 reaches a certain point (or threshold), the video processing will resume. As such, up to 20% of the time (instead of only the 5% blanking period) may be spent on still picture processing. In practice, less than 100% of the time may be spent processing either the video or the still pictures as the still/video processor 104a may not process either when switching between context.

The function performed by the diagrams of FIGS. 2-10 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a detector configured to generate a plurality of intermediate frames by processing a plurality of source frames, wherein said intermediate frames have an intermediate resolution;
a processor configured to (i) generate a plurality of video frames by compressing said intermediate frames while in a first state, wherein said video frames have a video resolution lower than said intermediate resolution, (ii) activate a capture operation while in a second state, wherein said capture operation buffers a particular frame of said intermediate frames and (iii) return to said first state in response to said activation of said capture operation.

2. The apparatus according to claim 1, wherein (i) said processor is further configured to transition from said first state to a third state during a blanking period between said video frames, (ii) said processor in said third state generates a still picture by formatting said particular frame and (iii) said still picture has said intermediate resolution.

3. The apparatus according to claim 2, wherein said processor is further configured to transition from said third state to said first state if (i) said blanking period of said video frames ends before said generation of said still picture is complete and (ii) more of said intermediate frames are available to process.

4. The apparatus according to claim 2, wherein said processor is further configured to transition from said third state to a fourth state if (i) said generation of said still picture is complete and (ii) no more of said intermediate frames are available to process.

5. The apparatus according to claim 2, wherein said processor is further configured to transition from said second state directly to said third state if (i) said capture of said particular frame is complete and (ii) a next of said intermediate frames is not yet available to process.

6. The apparatus according to claim 2, wherein said processor is further configured to transition from said first state to said third state if (i) a last of said video frames has been generated and (ii) said generation of said still picture is not complete.

7. The apparatus according to claim 4, wherein said processor is further configured to transition from said fourth state directly to said second state in response to a command to take said still picture.

8. The apparatus according to claim 4, wherein said processor is further configured to transition from said fourth state to said first state in response to a command to record video.

9. The apparatus according to claim 2, wherein generation of said video frames is uninterrupted by generation of said still picture.

10. The apparatus according to claim 1, wherein (i) said processor is further configured to activate said capture operation in said second state before said particular frame has been converted into a still picture and (ii) said capture operation buffers another particular frame of said intermediate frames.

11. A method for still capture during continuous video capture, comprising the steps of:
   (A) generating a plurality of intermediate frames by processing a plurality of source frames using a detector, wherein said intermediate frames have an intermediate resolution;
   (B) generating a plurality of video frames by compressing said intermediate frames using a processor in a first state, wherein said video frames have a video resolution lower than said intermediate resolution;
   (C) activating a capture operation using said processor in a second state, wherein said capture operation buffers a particular frame of said intermediate frames; and
   (D) returning said processor to said first state in response to said activating of said capture operation.

12. The method according to claim 11, further comprising the step of:
   transitioning said processor from said first state to a third state during a blanking period between said video frames, wherein (i) said processor in said third state generates a still picture by formatting said particular frame and (ii) said still picture has said intermediate resolution.

13. The method according to claim 12, further comprising the step of:
   transitioning said processor from said third state to said first state if (i) said blanking period of said video frames ends before said generation of said still picture is complete and (ii) more of said intermediate frames are available to process.

14. The method according to claim 12, further comprising the step of:
   transitioning said processor from said third state to a fourth state if (i) said generation of said still picture is complete and (ii) no more of said intermediate frames are available to process.

15. The method according to claim 12, further comprising the step of:
   transitioning said processor from said second state directly to said third state if (i) said capture of said particular frame is complete and (ii) a next of said intermediate frames is not yet available to process.

16. The method according to claim 12, further comprising the step of:
   transitioning said processor from said first state to said third state if (i) a last of said video frames has been generated and (ii) said generation of said still picture is not complete.

17. The method according to claim 14, further comprising the step of:
   transitioning said processor from said fourth state directly to said second state in response to a command to take said still picture.

18. The method according to claim 14, further comprising the step of:
   transitioning said processor from said fourth state to said first state in response to a command to record video.

19. The method according to claim 12, wherein generation of said video frames is uninterrupted by generation of said still picture.

20. An apparatus comprising:
   means generating a plurality of intermediate frames by processing a plurality of source frames, wherein said intermediate frames have an intermediate resolution; and
   means for processing configured to (i) generate a plurality of video frames by compressing the intermediate frames while in a first state, wherein the video frames have a video resolution lower than the intermediate resolution, (ii) activate a capture operation while in a second state, wherein the capture operation buffers a particular frame of the intermediate frames and (iii) return to the first state in response to the activation of the capture operation.

* * * * *